US006898442B2

(12) United States Patent
Ghavami

(10) Patent No.: US 6,898,442 B2
(45) Date of Patent: May 24, 2005

(54) WIDE-BAND ARRAY ANTENNA

(75) Inventor: Mohammad Ghavami, Tokyo (JP)

(73) Assignee: Sony Corporation, Tokyo (JP)

(*) Notice: Subject to any disclaimer, the term of this patent is extended or adjusted under 35 U.S.C. 154(b) by 619 days.

(21) Appl. No.: 10/084,547

(22) Filed: Feb. 26, 2002

(65) Prior Publication Data

US 2003/0017851 A1 Jan. 23, 2003

(30) Foreign Application Priority Data

Feb. 28, 2001 (JP) ..................................... P2001-055453

(51) Int. Cl.$^{7}$ ................................................ H04B 1/38

(52) U.S. Cl. ........................ 455/562.1; 455/19; 455/25; 455/63.4; 455/83; 455/575.7; 342/372; 342/373; 375/267; 375/347

(58) Field of Search ........................... 455/19, 25, 63.4, 455/83, 562.1, 575.7; 342/342, 368–377; 375/347, 267

(56) References Cited

U.S. PATENT DOCUMENTS 4,321,605 A * 3/1982 Lopez ........................ 343/844
5,585,803 A * 12/1996 Miura et al. ................ 342/372
6,075,484 A * 6/2000 Daniel et al. ............... 342/372
6,252,542 B1 * 6/2001 Sikina et al. ............... 342/174
6,519,478 B1 * 2/2003 Scherzer et al. ......... 455/562.1

* cited by examiner

*Primary Examiner*—William Trost
*Assistant Examiner*—James D Ewart
(74) *Attorney, Agent, or Firm*—Jay H. Maioli

(57) ABSTRACT

A wide-band array antenna using a single real-valued multiplier for each antenna element is simple in construction and suitable for wide-band code division multiple access (WCDMA) mobile communication systems. A rectangular array antenna is formed by N×M antenna elements. Each antenna element has a frequency dependent gain which is the same for all elements. Each antenna element is connected to said single real-valued multiplier with a single real-valued coefficient, which is determined by properly selecting a number of points on a u-v plane defined for simplifying the design procedure according to the selected design algorithm.

6 Claims, 7 Drawing Sheets

WIDE-BAND ARRAY ANTENNA

BACKGROUND OF THE INVENTION

1. Field of the Invention

The present invention relates to a wide-band array antenna, particularly relates to a wide-band array antenna for improving the performance of a mobile communication system employing the wide-band code division multiple access (WCDMA) transmission scheme.

2. Description of the Related Art

Smart antenna techniques at the base station of a mobile communication system can dramatically improve the performance of the system by employing spatial filtering in a WCDMA system. Wide-band beam forming with relatively low fractional band-width should be engaged in these systems.

The current trend of data transmission in commercial wireless communication systems facilitates the implementation of smart antenna techniques. Major approaches for the designs of smart antenna include adaptive null steering, phased array and switched beams. The realization of the first two systems for wide-band applications, such as WCDMA requires a strong implementation cost and complexity. On each branch of a wide-band array, a finite impulse response (FIR) or an infinite impulse response (IIR) filter allows each element to have a phase response that varies with frequency. This compensates from the fact that lower frequency signal components have less phase shift for a given propagation distance, whereas higher frequency signal components have greater phase shift as they travel the same length.

Different wide-band beam forming networks have been already proposed in literature. The conventional structure of a wide-band beam former, that is, several antenna elements each connected to a digital filter for time processing, has been employed in all these schemes.

Conventional wide-band arrays suffer from the implementation of tapped-delay-line temporal processors in the beam forming networks. In some proposed wide-band array antennas, the number of taps is sometime very high which complicates the time processing considerably. In a recently proposed wide-band beam former, the resolution of the beam pattern at end-fire of the array is improved by rectangular arrangement of a linear array, but the design method requires many antenna elements which can only be implemented if micro-strip technology is employed for fabrication.

SUMMARY OF THE INVENTION

An object of the present invention is to provide a wide-band array antenna for sending or receiving the radio frequency signals of a mobile communication system, which has a simple construction and has a bandwidth compatible with future WCDMA applications.

To achieve the above object, according to a first aspect of the present invention, there is provided a wide-band array antenna comprising N×M antenna elements, and multipliers connected to each said antenna element, each having a real-valued coefficient, wherein assuming that said elements are placed at distances of $d_1$ and $d_2$ in directions of N and M, respectively, the coefficient of each said multiplier is $C_{nm}$, and by defining two variables as $v=\omega d_1 \sin\theta/c$, and $u=\omega d_2 \cos\theta/c$, the response of said array antenna can be given as follows:

$$H(u, v) = \sum_{n=1}^{N}\sum_{m=1}^{M} C_{nm} e^{j(n-1)v} e^{-j(m-1)u} \tag{5}$$

by appropriately selecting points $(u_{0l}, v_{0l})$ on the u-v plane according to a predetermined angle of beam pattern and the center frequency of a predetermined frequency band, the elements $b_l$ of an auxiliary vector $B=[b_1, b_2, \ldots, b_L]$($L<<N\times M$) can be calculated and the coefficient $C_{nm}$ of each said multiplier corresponding to each antenna element can be calculated according to $$C_{nm} = \sum_{l=1}^{L} G_a^{-1} b_l e^{-j(n-1)v_{o_l}} e^{j(m-1)u_{o_l}} \tag{17}$$

In the wide-band array antenna of the present invention, preferably said each antenna element has a frequency dependent gain which is the same for all elements.

In the wide-band array antenna of the present invention, preferably the gain of the antenna element has a predetermined value at a predetermined frequency band including the center frequency and at a predetermined angle.

Preferably, the wide-band array antenna of the present invention further comprises an adder for adding the output signals from said multipliers.

In the wide-band array antenna of the present invention, preferably a signal to be sent is input to said multipliers and the output signal of each said multiplier is applied to the corresponding antenna element.

In the wide-band array antenna of the present invention, preferably said selected points $(u_{0l}, v_{0l})$ on the u-v plane for computing the elements of said auxiliary vector B are symmetrically distributed on the u-v plane.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Below, preferred embodiments will be described with reference to the accompanying drawings.

Figure 1:
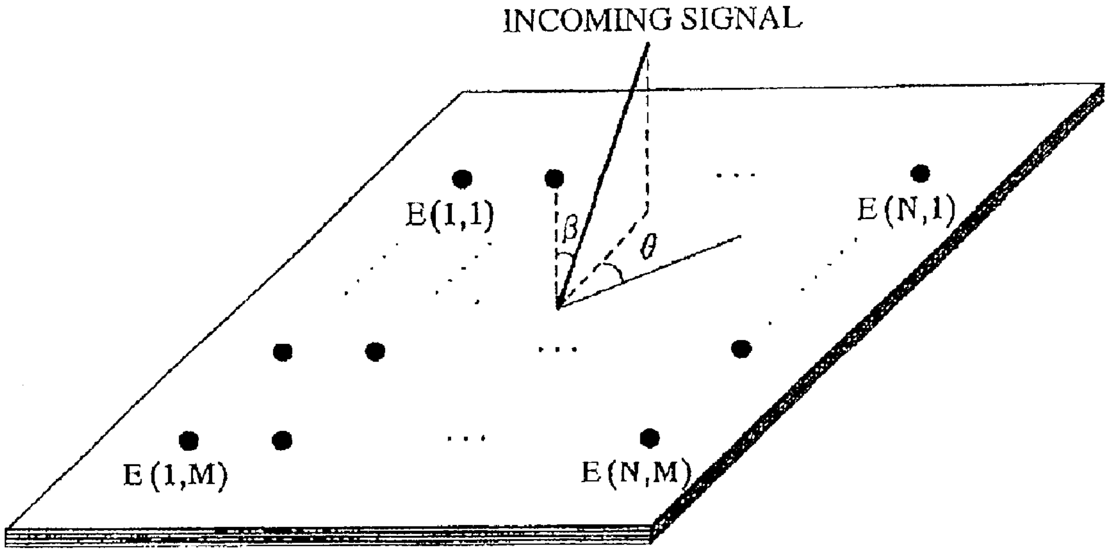
FIG. 1 is diagram showing a simplified structure of an embodiment of the wide-band array antenna according to the present invention.

FIG. 1 shows a simplified structure of a wide-band array antenna according to an embodiment of the present invention. As illustrated, the wide-band array antenna of the present embodiment is constituted by N×M antenna elements E(1,1), . . . , E(1,M), . . . , E(N,1), . . . , E(N,M). Here, it is supposed that each antenna element has a frequency dependant gain which is the same for all elements. The direction of the arriving signal is determined by the azimuth angle θ and the elevation angle β. As in most practical cases, it is assumed that the elevation angles of the incoming signals to the base station antenna array are almost constant. Here, without loss of generality, the elevation angle β is considered as β=90 degrees. The inter-element spacing for the directions of N and M are $d_1$ and $d_2$, respectively.

To consider the phase of the arriving signal at the element E(n,m), the element E(1,1) is considered to be the phase reference point and the phase of the receiving signal at the reference point is therefore 0. With this assumption, the phase of the signal at the element E(n,m) is given by the following equation.

$$\Phi(n, m) = \frac{\omega}{c}(d_1(n-1)\sin\theta - d_2(m-1)\cos\theta) \tag{1}$$

where 1≦n≦N, 1≦m>M. In equation (1), θ is considered as the angle of the arrival (AOA), ω=2Πf is the angular frequency and c is the propagation speed of the signal. Note that if the elevation angle β was constant but not necessarily near 90 degrees, then it is necessary to modify $d_1$ and $d_2$ to new constant values of $d_1$ sin Φ and $d_2$ sin Φ, respectively, which are in fact the effective array inter-element distances in an environment with almost fixed elevation angles.

In the array antenna of the present embodiment, unlike conventional wide-band array antennas, it is assumed that each antenna element is connected to a multiplier with only one single real coefficient $C_{nm}$. Hence, the response of the array with respect to frequency and angle can be written as follows:

$$\begin{aligned} H_A(\omega, \theta) &= G_a(\omega)\sum_{n=1}^{N}\sum_{m=1}^{M} C_{nm}e^{j\frac{\omega}{c}(d_1(n-1)\sin\theta - d_2(m-1)\cos\theta)} \\ &= G_a(\omega)H(\omega, \theta) \end{aligned} \tag{2}$$

In equation (2), $G_a(\omega)$ represents the frequency-dependent gain of the antenna elements. Here, for simplicity, two new variables v and u are defined as follows.

$$v = \frac{\omega d_1}{c}\sin\theta \tag{3}$$

$$u = \frac{\omega d_2}{c}\cos\theta \tag{4}$$

Applying equation (3) and (4) in equation (2) gives the following equation.

$$H(u, v) = \sum_{n=1}^{N}\sum_{m=1}^{M} C_{nm}e^{j(n-1)v}e^{-j(m-1)u} \tag{5}$$

Figure 2:
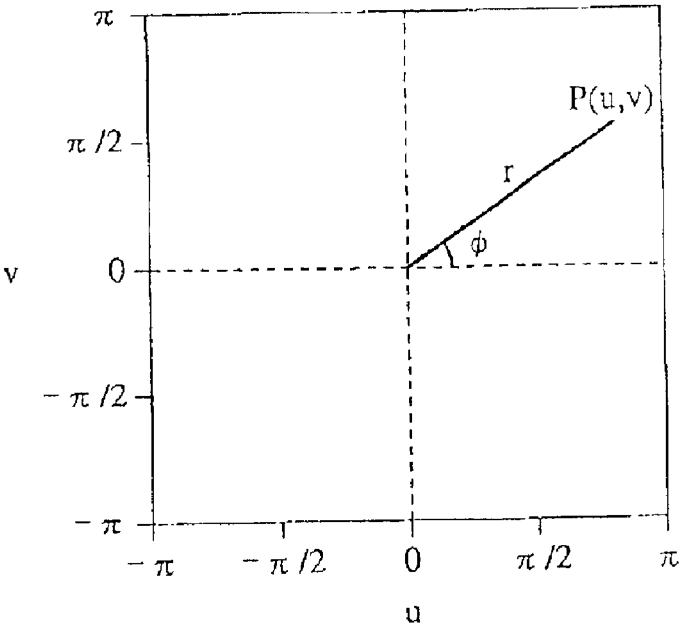
FIG. 2 shows a 2D u-v plane defined for simplification of the design of the beam forming network.

With a minor difference, equation (5) represents a two dimensional frequency response in the u-v plane. The coordinates u and v, as illustrated in FIG. 2, are limited to a range from –Πto +Π, because for example the variable u can be written as $$|u| = \left|\frac{\omega d_2}{c}\cos\theta\right| \le \frac{\omega d_2}{c} \le \frac{2\pi f}{c}\frac{\lambda_{\min}}{2} = \frac{2\pi f}{c}\frac{c}{2f_{\max}} \le \pi \tag{6}$$

Note that for a well-correlated array antenna system, it is required that $d_1$, $d_2<\lambda_{min}/2=1/2f_{max}$, where $\lambda_{min}$ and $f_{max}$ are the minimum wavelength and the corresponding maximum frequency, respectively. Equation (6) is valid for v as well.

According to equations (3) and (4), it can be written that $$\frac{v}{u} = \frac{d_1}{d_2}\tan\theta = \tan\phi \tag{7}$$

In the special case of $d_1=d_2$, θ and Φ are equal, otherwise, Φ can be given by the following equation.

$$\phi = \tan^{-1}\left(\frac{d_1}{d_2}\tan\theta\right) \tag{8}$$

Furthermore, the following equation can be given as $$\left(\frac{v}{\omega d_1/c}\right)^2 + \left(\frac{u}{\omega d_2/c}\right)^2 = 1 \tag{9}$$

Equation (9) demonstrates an ellipse with the center at u=v=0 on the u-v plane. In the special case of $d_1=d_2=d$, the equation (9) can be rewritten as following $$v^2 + u^2 = \left(\frac{\omega d}{c}\right)^2 \tag{10}$$

Equation (10) demonstrates circles with radius ωd/c.

Equations (8) and (9) represent the loci of constant angle and constant frequency in the u-v plane, respectively.

Figure 3:
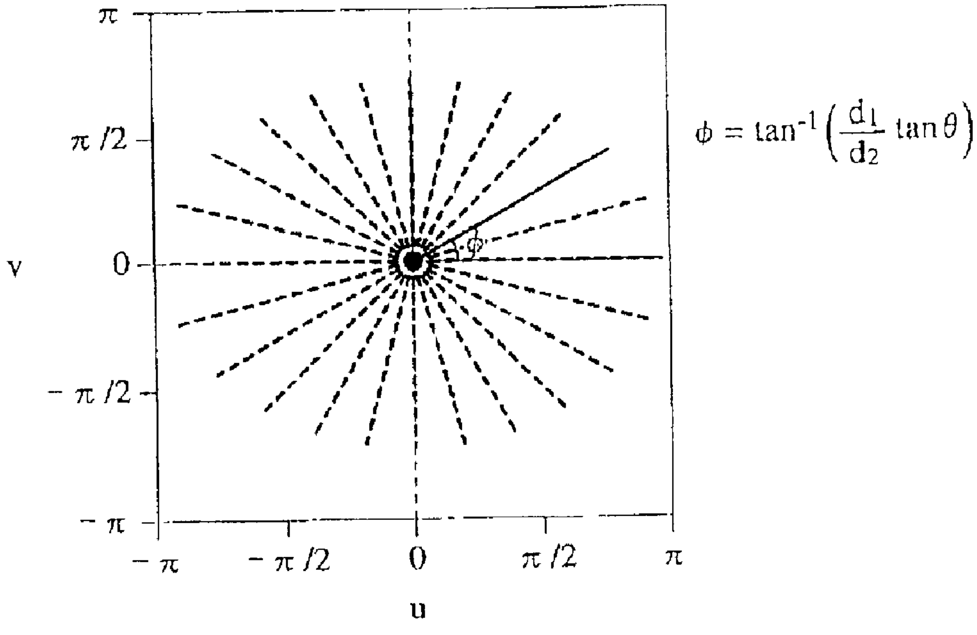
FIG. 3 is a diagram showing the loci of constant: angle θ on the u-v plane.
Figure 4:
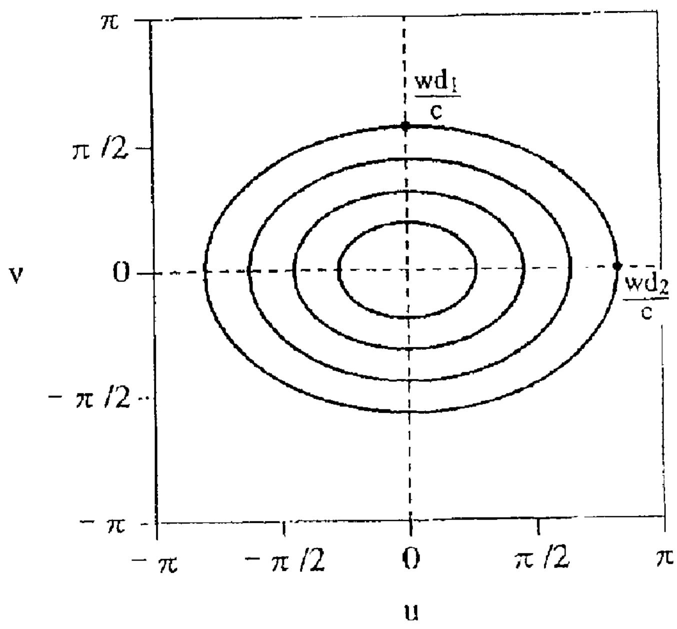
FIG. 4 is a diagram showing the loci of constant: angular frequency ω on the u-v plane.

FIGS. 3 and 4 are diagrams showing the two loci of constant angle θ and constant angular frequency X according to equations (8) and (9). Plotting the two loci in FIG. 3 and FIG. 4, is helpful for determination of the angle and frequency characteristics of the wide-band beam forming in the array antenna of the present embodiment.

Figure 5:
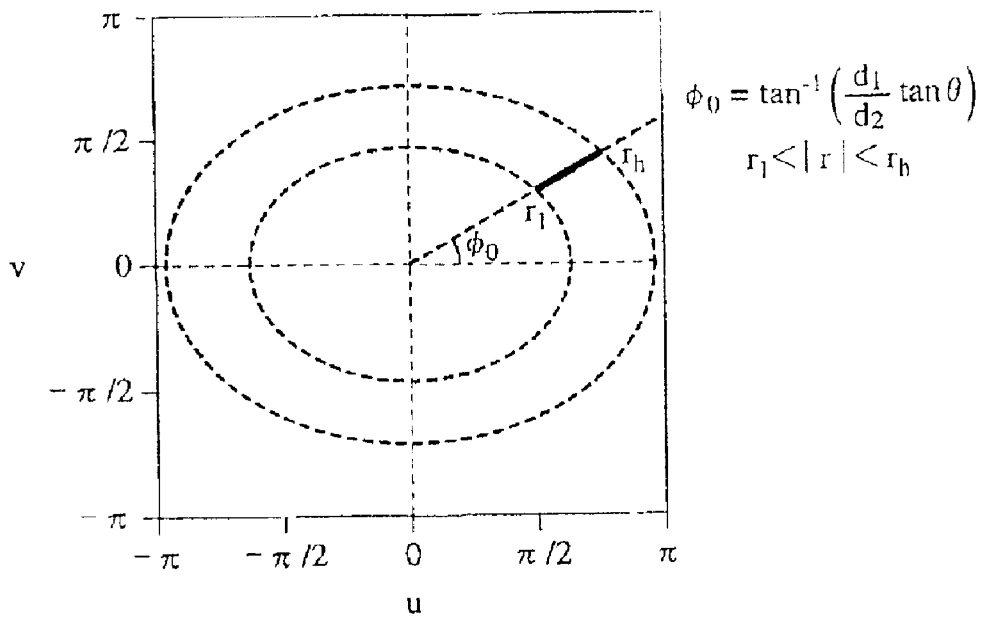
FIG. 5 is a diagram showing the desirable points on the u-v plane for designing the wide-band array antenna.

Here, assume that an array antenna system is to be designed with $\theta=\theta_0$, and the center frequency is $\omega=\omega_0$. A demonstrative plot, showing the location of the desired points on the u-v plane is given in FIG. 5. This location is limited by $\Phi_0=\tan^{-1}(d_1 \tan \theta_0/d_2)$ and $r_1<r<r_h$, where $r_1$ and $r_h$ can be given as follows, respectively.

$$r_l = \frac{\omega_l}{d}\bar{d},\ r_h = \frac{\omega_h}{c}\bar{d} \text{ and } \bar{d} = \sqrt{d_1^2\sin^2\theta_0 + d_2^2\cos^2\theta_0} \tag{11}$$

The symmetry of the loci with respect to the origin of the u-v plane results real values of the coefficients $C_{nm}$ for the multipliers of each antenna element. In the ideal wide-band system, the ideal values of the function H(u,v) can be assigned as follows.

$$H_{ideal} = \begin{cases} G_a^{-1}; \ \phi_0 = \tan^{-1}\left(\frac{d_1}{d_2}\tan\theta_0\right), \ r_l < |r| < r_h \\ 0; \quad \text{otherwise} \end{cases} \tag{12}$$

For example, if the elements have band pass characteristics $G_a(\omega)$ in the frequency interval of $\omega_l<\omega<\omega_h$, then $G_a^{-1}(\omega)$ will have an inverse characteristics, that is, band attenuation in the same frequency band. This simple modification in the gain values of the u-v plane makes it possible to compensate to the undesired features of the antenna elements.

It is clear that the ideal case is not implementable with practical algorithms. So in the array antenna system of the present embodiment, a method for determination of the coefficients $C_{nm}$ is considered. Below, an explanation of the method for determination of the coefficients $C_{nm}$ for multipliers connected to the antenna elements will be given in detail.

For the design of the multipliers, instead of controlling all points of the u-v plane, which is very difficult to do, L points on this plane are considered. These L points are symmetrically distributed on the u-v plane and do not include the origin, thus L considered an even integer. Two vectors are defined as follows.

$$B=[b_1, b_2, \ldots, b_L]^T \tag{13}$$

$$H_0=[H(u_{0_1}, v_{0_1}), H(u_{0_2}, v_{0_2}), \ldots, H(u_{0_L}, v_{D_L})]^T \tag{14}$$

In equations (13) and (14), the superscript $^T$ stands for transpose. The elements of the vector $H_0$ have the same values for any two pairs $(u_{0l}, v_{0l})$, where l=1, 2, . . . , L, which are symmetrical with respect to the origin of the u-v plane. In addition, they consider the frequency-dependence of the elements in a way like equation (12). The vector B is an auxiliary vector and will be computed in the design procedure.

Here, assume that H(u,v) is expressed by the multiplication of two basic polynomials and then the summation of the weighted result as follows:

$$H(u, v) = \sum_{l=1}^{L} b_l\left(\sum_{n=1}^{N} e^{j(n-1)(v-v_{0_l})}\right)\left(\sum_{m=1}^{M} e^{-j(m-1)(u-u_{0_l})}\right) \tag{15}$$

In fact with this form of H(u,v), the problem of direct computation of N×M coefficients $C_{nm}$ from a complicated system of N×M equations is simplified to a new problem of solving only L equations, because normally L is select as L<<N×M. The final task of the beam forming scheme in the present embodiment is to find the coefficients $C_{nm}$ for each multiplier from $b_l$.

By rearranging equation (14), the relationship between $b_1$ and the coefficient $C_{nm}$ can be given as follows:

$$H(u, v) = \sum_{n=1}^{N}\sum_{m=1}^{M}\left\{\sum_{l=1}^{L} b_l e^{-j(n-1)v_{0_l}} e^{j(m-1)u_{0_l}}\right\} e^{j(n-1)v} e^{-j(m-1)u} \tag{16}$$

Comparing with equation (5), also by using equation (2), the coefficient $C_{nm}$ is given as follows:

$$C_{nm} = \sum_{l=1}^{L} G_a^{-1} b_l e^{-j(n-1)v_{0_l}} e^{j(m-1)u_{0_l}} \tag{17}$$

That is, after calculation of the vector B, the coefficient $C_{nm}$ can be found according to equation (17) It should be noted that $G_a^{-1}$ is a function of frequency, and hence, varies with the values of $u_{0l}$ and $v_{0l}$. The computation of the vector B is not difficult from equation (15). With the definition of an L×L matrix A with the elements $\{a_{kl}\}$, 1≦k, 1≦L as follows:

$$a_{kl} = \sum_{n=1}^{N} e^{j(n-1)(v_{0_k}-v_{0_l})}\sum_{m=1}^{M} e^{-j(m-1)(u_{0_k}-u_{0_l})} \tag{18}$$

From equations (13), (14) and (15), the following equation can be given.

$$\tilde{H}_0=A\ B \tag{19}$$

Thus, the vector B is obtained as follows:

$$B=A^{-1}\tilde{H}_0 \tag{20}$$

It is assumed that the matrix A has a nonzero determinant, so that its inverse exists. Then, the values of the coefficients $C_{nm}$ are computed from equation (17) and the design is complete.

Figure 6:
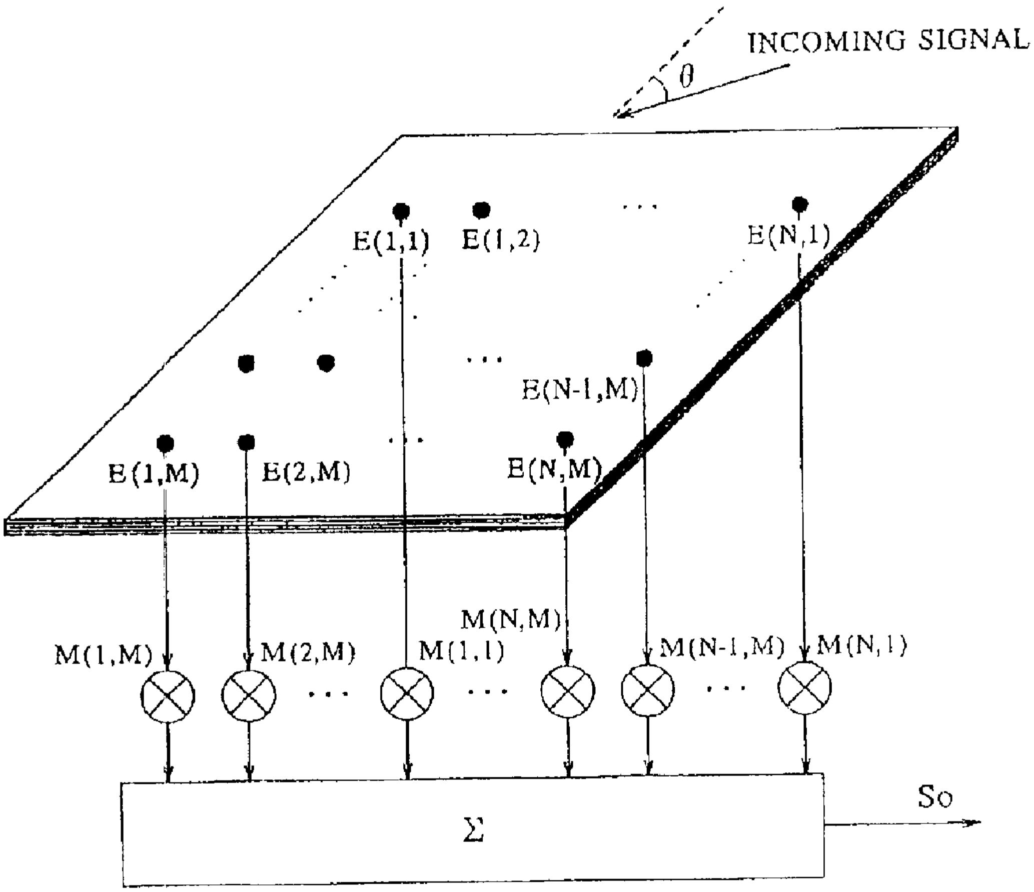
FIG. 6 is a diagram showing the configuration of the wide-band array antenna used for receiving signals.
Figure 7:
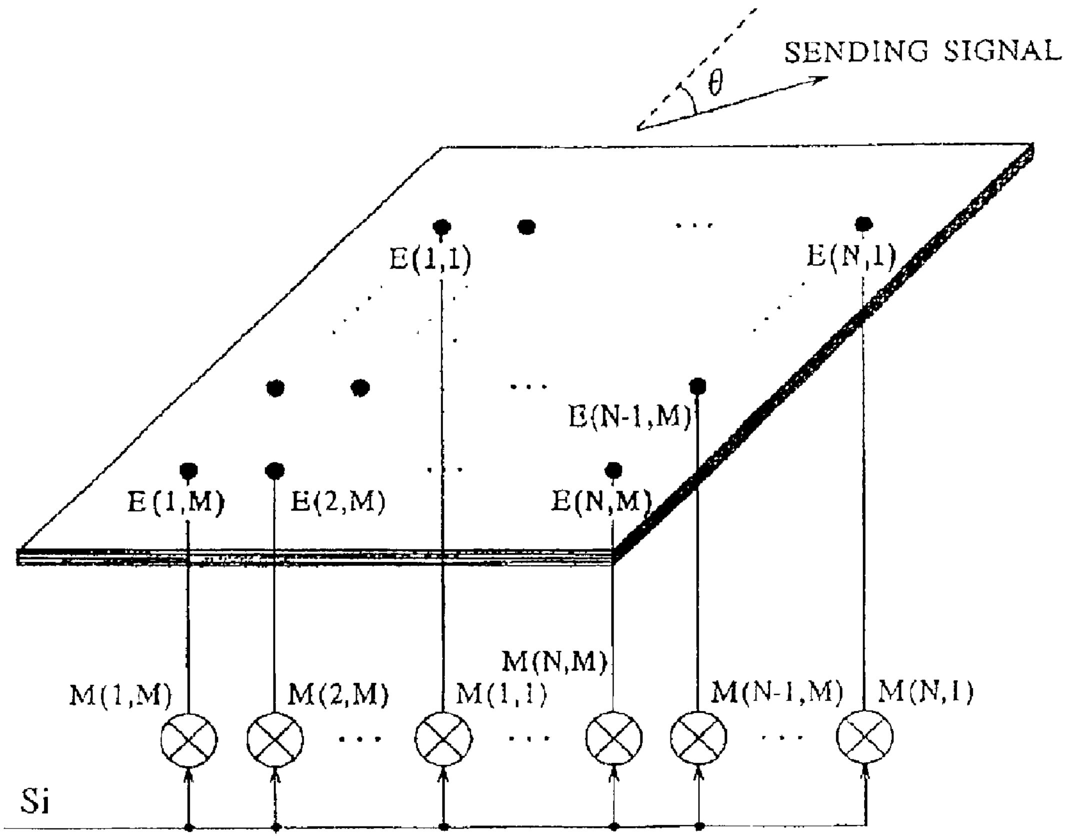
FIG. 7 is diagram showing the configuration of the wide-band array antenna used for sending signals.

FIG. 6 and FIG. 7 are diagrams showing the wide-band array antennas of the present embodiment used for receiving and sending signals, respectively. As described above, the array antenna is constituted by N×M antenna elements E(1,1), . . . , E(1,M), . . . , E(N,1), . . . , E(N,M). As illustrated in FIG. 6, when the array antenna is applied for receiving signals, these antenna elements are connected to multipliers M(1,1), . . . , M(1,M), . . . , M(N,1), . . . , M(N,M), respectively. Each antenna element has a frequency dependant gain which is the same for all elements, and each multiplier M(n,m) (1≦n≦N, 1≦m≦M) has a coefficient $C_{nm}$ of a real value obtained according to the design procedure described above. The output signals of the multipliers are input to the adder, and a sum So of the input signals is output from the adder as the receiving signal of the array antenna.

For each arriving angle of the incoming signals, a set of N×M coefficients $C_{nm}$ is calculated previously when designing the array antenna, thus by switching the coefficient sets for the antenna elements sequentially, the signals arriving from all direction around the antenna array can be received. That is, the sweeping of the direction of the beam pattern can be realized by switching the sets of coefficient used for calculation in each multiplier but not mechanically turning the array antenna round.

As illustrated in FIG. 7, when the array antenna if used for sending the signals, the signal to be sent is input to all of the multipliers M(1,1), . . . , M(1,N), . . . , and M(N,M). the signal is multiplied by the coefficient $C_{nm}$ at each multiplier then sent to each corresponding antenna element. The signals radiated from the antenna elements interact with each other, producing a sending signal that is the sum of the individual signals radiated from the antenna elements. Therefore, a desired beam pattern for sending signals to a predetermined direction can be obtained.

Bellow, an example of a simple and efficient 4×4 rectangular array antenna will be presented. First, the procedure of designing of the beam forming, that is, the determination of the coefficient of the multiplier connected to each antenna element will be described, then the characteristics of the array according to the result of simulation will be shown.

Here, the angle of the beam former is assumed to be $\theta_0=-40$ degrees with the center frequency of $\omega_0=0.7\Pi c/d$, where $d=d_1=d_2$. Because of the limitation of the number of the points on the u-v plane in this example, it is assumed that $G_a=1$. First, four pairs of critical points $(u_{0l}, v_{0l})$ are calculated as follows:

$$P_1: (u_{0_1}, v_{0_1})=(u_0,v_0) \tag{21}$$

$$P_2: (u_{0_2}, v_{0_2})=(-u_0, -v_0) \tag{22}$$

$$P_3: (u_{0_3}, v_{0_3})=(v_0, -u_0) \tag{23}$$

$$P_4: (u_{0_4}, v_{0_4})=(-v_0, u_0) \tag{24}$$

In equations (21) to (24), variables $u_0$ and $v_0$ have been found from equations (3) and (4), respectively. Then, the vector $H_0$ can be formed as $$\tilde{H}_0=H_0=[1,1,0,0]^T \tag{25}$$

Next, the matrix A is constructed using equation (18) and the vector B is calculated from equation (20). Finally, coefficients $C_{nm}$ for $1\leqq m, n\leqq 4$ are computed from equation (17). Due to the symmetry of the selected points $(u_{ol}, v_{0l})$ in the u-v plane, the values of coefficients $C_{nm}$ are all real. This simplifies the computation in practical situations.

Figure 8:
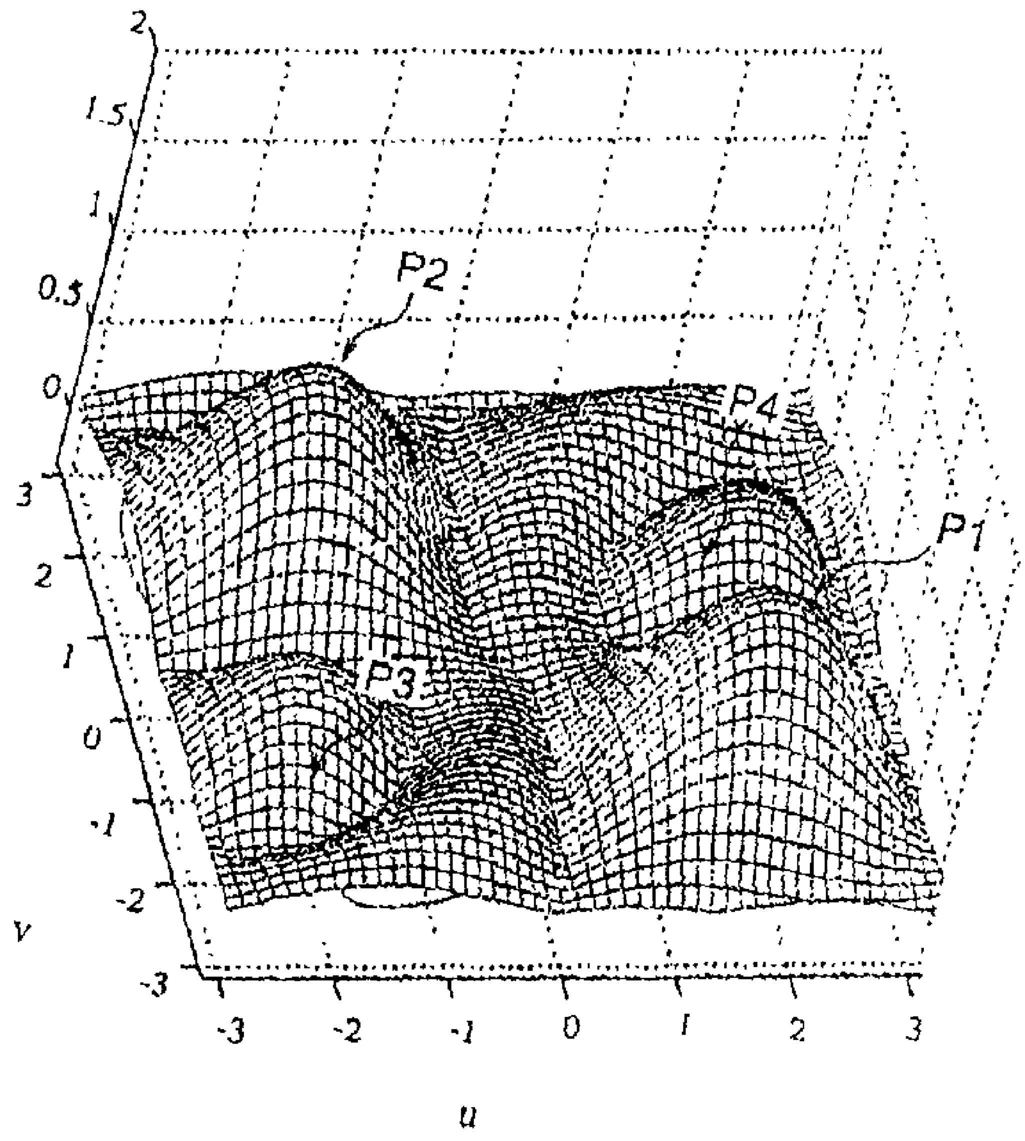
FIG. 8 is a diagram showing a two dimensional frequency response H(u,v) calculated according to the designed coefficients.

FIG. 8 shows the actual two dimensional frequency response H(u,v) calculated from equation (5) according to the coefficients $C_{nm}$ obtained in the design procedure described above. Clearly, there are two peak points at P1 and P2, and two zeros at P3 and P4, respectively. The important result of this pattern is that in a relatively large neighborhood of the point corresponding to $\omega=\omega_0$, almost a constant amplitude of the frequency response is obtained. That is, the designed 4×4 rectangular array antenna gives a wide-band performance when it is designed for the center frequency $\omega_0$ of the frequency band.

Figure 9:
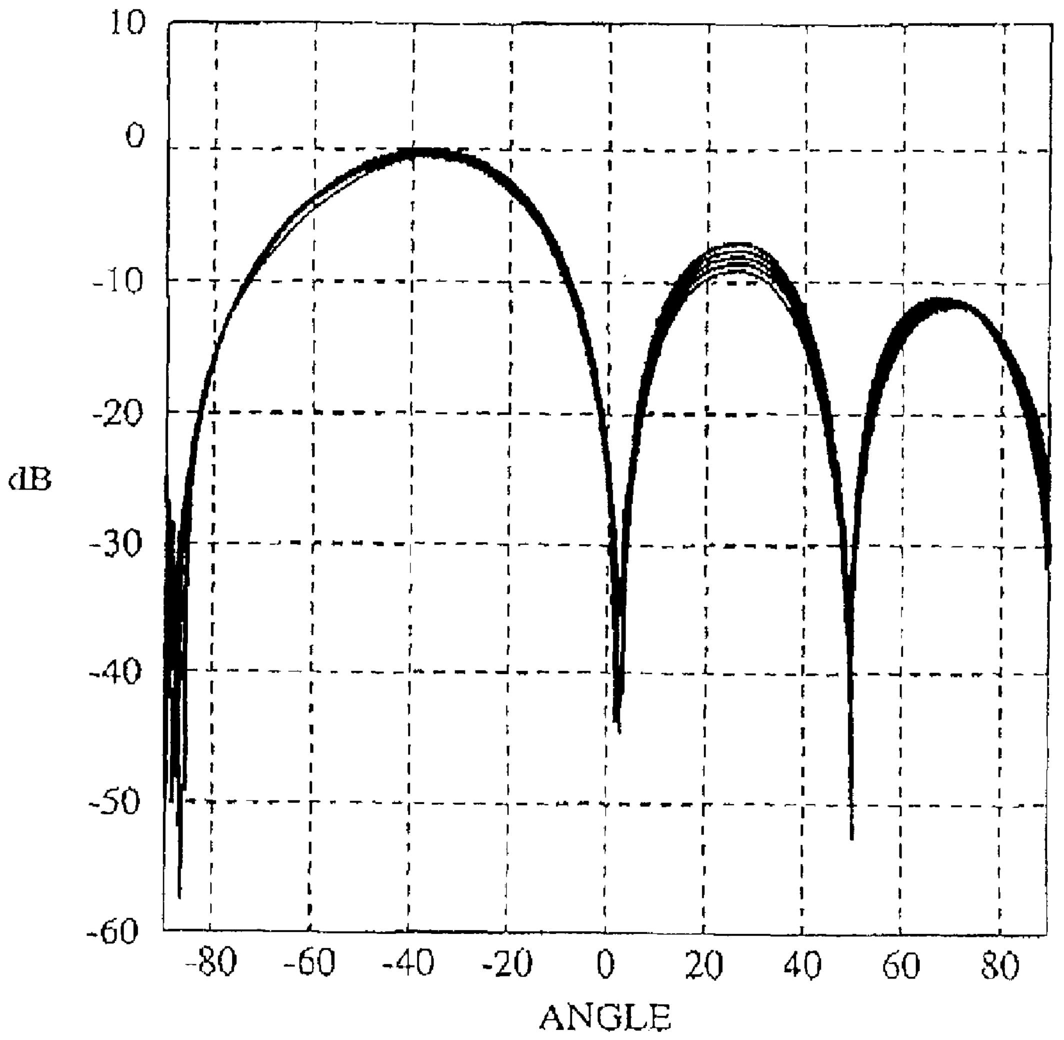
FIG. 9 is a diagram showing plural directional beam patterns on an angular range including the assumed beam forming angle for different frequencies.

FIG. 9 demonstrates this fact more clearly. In FIG. 8, multiple directional beam patterns at an angular range including the assumed beam forming angle $\theta_0$, that is −40 degrees for different frequencies from $\omega_l$ to $\omega_h$ are illustrated. The frequency response according to this figure is from $\omega_l=0.6\Pi c/d$ to $\omega_h=0.8\Pi c/d$, that is, a fractional bandwidth of 28.6 percent. Assuming a WCDMA system with the carrier frequency of about 2.1 GHz for IMT-2000, that is, a wide-band signal with a center frequency of $f_0=2.1$ GHz, the inter-element spacing will be found as follows:

$$d = 0.7\pi\frac{c}{2\pi f_0} = 0.05 \text{ m} \tag{26}$$

In the WCDMA mobile communication system for IMT-2000, the higher and lower frequencies will be $f_h=2.4$ GHz and $f_1=1.8$ GHz, respectively. This frequency band includes all frequencies assignment of the future WCDMA mobile communication system.

According to the present invention, a new array antenna with a wide band width can be constituted by a rectangular array formed by a plurality of simple antenna elements with a simple real-valued multiplier connected to each of the antenna element. The coefficient of each multiplier can be found according to the design algorithm of the beam forming network of the present invention.

Comparing to the previously proposed wide-band beam formers, the wide-band array antenna of the present invention employs lower number of antenna elements to realize a wide-band array. In the simulation of the wide-band beam former as described above, an array with 4×4=16 elements having a frequency independent beam pattern in the desired angle is obtained.

Also, in the wide-band array antenna of the present invention, there is no delay element in the filters that are connected to each antenna element. Therefore the rectangular wide-band array antenna without time processing can be realized.

In conventional array antennas, since most of the coefficients of multipliers connected to the antenna elements are complex valued, the signal process in the multipliers is complicated due to the calculation with the complex coefficients. But according to the wide-band array antenna of the present invention, the multiplier connected to each antenna element has a single real coefficient, so the signal processing is simple and fast, also the dynamic range of the coefficients are much lower than other time processing based methods.

Note that the present invention is not limited to the above embodiments and includes modifications within the scope of the claims.

What is claimed is:

1. A wide-band array antenna comprising:

N×M antenna elements, and a plurality of multipliers, one multiplier connected to each said antenna element, and each multiplier having a real-valued coefficient, wherein when said antenna elements are placed at distances of d1 and d2 in directions of N and M, respectively, the real-valued coefficient of each multiplier is $C_{nm}$, and by defining two variables as $v=\omega d_1 \sin\theta/c$, and $u=\omega d_2 \cos\theta/c$, the response of said wide-band array antenna can be given as:

$$H(u,v) = \sum_{n=1}^{N}\sum_{m=1}^{M} C_{nm}e^{j(n-1)v}e^{-j(m-1)u} \tag{5}$$

by selecting points $(u_{01}, v_{01})$ on a u-v plane according to a predetermined angle of beam pattern and a center frequency of a predetermined frequency band, elements $b_1$ of an auxiliary vector $B=[b_1, b_2, \ldots, b_L]$ (L<<N×M) are calculated and the coefficient $C_{nm}$ of each said multiplier corresponding to each antenna element is calculated as $$C_{nm} = \sum_{l=1}^{L} G_a^{-1} b_l e^{-j(n-1)v_{0_l}} e^{j(m-1)u_{0_l}} \tag{17}$$

2. The wide-band array antenna as set forth in claim 1, wherein each of said antenna elements has a frequency dependent gain which is the same for all antenna elements.

3. The wide-band array antenna as set forth in claim 1, wherein each of said antenna elements has a gain set to a predetermined value at a predetermined frequency band, including the center frequency, at a predetermined angle.

4. The wide-band array antenna as set forth in claim 1, further comprising an adder for adding output signals from said plurality of multipliers.

5. The wide-band array antenna as set forth in claim 1, wherein a signal to be sent is input to said plurality of multipliers and an output signal of each said multiplier is applied to a corresponding antenna element.

6. The wide-band array antenna as set forth in claim 1, wherein said selected points ($u_{01}$, $v_{01}$) on the u-v plane for computing the elements of said auxiliary vector B are symmetrically distributed on the u-v plane.

* * * * *